United States Patent
Kim et al.

(10) Patent No.: US 11,478,104 B2
(45) Date of Patent: Oct. 25, 2022

(54) ELECTRIC POT HAVING IMPROVED FUNCTION OF CONTINUING TEMPERATURE-MAINTENANCE OPERATION

(71) Applicant: LG ELECTRONICS INC., Seoul (KR)

(72) Inventors: Namhun Kim, Seoul (KR); Ho Yong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 16/709,642

(22) Filed: Dec. 10, 2019

(65) Prior Publication Data

US 2020/0187702 A1    Jun. 18, 2020

(30) Foreign Application Priority Data

Dec. 14, 2018    (KR) .......................... 10-2018-0162477

(51) Int. Cl.
*A47J 27/21* (2006.01)
*H05B 1/02* (2006.01)

(52) U.S. Cl.
CPC ..... *A47J 27/21083* (2013.01); *A47J 27/2105* (2013.01); *H05B 1/0269* (2013.01)

(58) Field of Classification Search
CPC ... H05B 1/0269; A47J 27/2105; A47J 27/212; A47J 27/21083
USPC ....................................................... 219/442
See application file for complete search history.

(56) References Cited

U.S. PATENT DOCUMENTS

| | | | | |
|---|---|---|---|---|
| 3,343,415 A * | 9/1967 | Johnston | ............... | G01F 23/263 73/304 C |
| 3,384,195 A * | 5/1968 | Jepson | ............... | H01R 13/7137 D7/354 |
| 3,784,788 A * | 1/1974 | Fourny | .................. | G05D 23/24 392/447 |
| 3,908,111 A * | 9/1975 | Du Bois | ............. | A47J 37/1209 219/442 |
| 4,197,581 A * | 4/1980 | Watrous | ................. | G05D 23/24 219/494 |
| 4,451,894 A * | 5/1984 | Dougherty | ............ | G01F 23/263 73/304 C |

(Continued)

FOREIGN PATENT DOCUMENTS

EP           1 145 596 B1    8/2007
WO    WO 2008/155538 A2    12/2008

OTHER PUBLICATIONS

Extended European Search Report dated Mar. 26, 2020 issued in Application 19215505.9.

*Primary Examiner* — Eric S Stapleton
(74) *Attorney, Agent, or Firm* — KED & Associates LLP

(57) ABSTRACT

An electric pot may include a controller that controls a heater to perform a temperature-maintenance operation based on an input relating to a temperature-maintenance operation and based on information on temperatures. A memory may receive information in relation to a temperature-maintenance operation from the controller and may store the information and retain the stored information in relation to a temperature-maintenance operation regardless of whether a pot main body is attached to or detached from a supporter.

17 Claims, 8 Drawing Sheets

(56) References Cited

U.S. PATENT DOCUMENTS

| | | | | |
|---|---|---|---|---|
| 4,868,595 A * | 9/1989 | Tanaka | G03B 9/08 | 396/248 |
| 4,993,593 A * | 2/1991 | Fabiano | B67D 3/0022 | 366/147 |
| 5,567,458 A * | 10/1996 | Wu | A47J 27/004 | 426/523 |
| 5,613,399 A * | 3/1997 | Hannan | G01F 23/268 | 73/304 C |
| 5,643,485 A * | 7/1997 | Potter | E06B 3/66304 | 220/573.1 |
| 6,283,014 B1 * | 9/2001 | Ng | A47J 27/0802 | 99/332 |
| 6,565,903 B2 * | 5/2003 | Ng | A47J 27/0802 | 426/523 |
| 6,840,100 B1 * | 1/2005 | Wotiz | A45F 3/16 | 73/304 C |
| 6,963,051 B2 * | 11/2005 | You | A47J 27/004 | 219/432 |
| 7,148,451 B2 * | 12/2006 | Miyake | A47J 27/004 | 426/507 |
| 7,173,513 B2 * | 2/2007 | Laaser | G08C 17/02 | 340/12.51 |
| 7,718,928 B2 * | 5/2010 | He | A47J 27/09 | 219/431 |
| 7,926,418 B2 * | 4/2011 | Groll | A47J 37/067 | 99/422 |
| 8,171,843 B1 * | 5/2012 | Heffington | A47J 31/545 | 99/305 |
| 8,208,801 B2 * | 6/2012 | Brown | A47J 27/004 | 392/441 |
| 8,648,282 B2 * | 2/2014 | Garcia | A47J 27/004 | 220/322 |
| 9,545,168 B2 * | 1/2017 | Gabara | A47J 27/16 | |
| 9,801,482 B1 * | 10/2017 | Alexander | A47G 19/2288 | |
| 9,955,529 B2 * | 4/2018 | Baarman | A47J 27/004 | |
| 2002/0050211 A1 * | 5/2002 | Ng | A47J 27/0802 | 99/403 |
| 2005/0242086 A1 * | 11/2005 | Imura | G06K 19/0717 | 219/627 |
| 2007/0278202 A1 * | 12/2007 | Long | A47J 31/20 | 219/442 |
| 2008/0037966 A1 * | 2/2008 | Baarman | H05B 1/02 | 219/628 |
| 2010/0154534 A1 * | 6/2010 | Hampton | G01F 23/265 | 73/304 C |
| 2011/0265562 A1 * | 11/2011 | Li | A47J 27/212 | 73/304 C |
| 2012/0091117 A1 * | 4/2012 | Cheng | A47J 27/2105 | 219/385 |
| 2015/0305551 A1 * | 10/2015 | Rosati | A47J 31/56 | 99/280 |
| 2015/0312964 A1 * | 10/2015 | Sorenson | A47J 37/0676 | 219/443.1 |
| 2017/0135159 A1 * | 5/2017 | Sorenson | H05B 3/70 | |

* cited by examiner

ELECTRIC POT HAVING IMPROVED FUNCTION OF CONTINUING TEMPERATURE-MAINTENANCE OPERATION

CROSS-REFERENCE TO RELATED APPLICATION

This application claims priority to and the benefit of Korean Patent Application No. 10-2018-0162477, filed in Korea on Dec. 14, 2018, the disclosure of which is incorporated herein by reference in its entirety.

BACKGROUND

1. Field

The present disclosure relates to an electric pot having an improved function of continuing a temperature-maintenance operation.

2. Background

An electric pot is an apparatus that may boil fluids such as water and that may keep the fluids warm. The electric pot is also an apparatus that may boil water more readily than a gas stove. Accordingly, the pot may be used to boil water for coffee or tea. Additionally, the electric pot may be used for various purposes. For example, the electric pot may be used to cook ramen noodles, to heat soup, stew, and the like, to steam food, and the like.

FIG. 1 shows an electric pot of the related art. FIG. 1 is a cross-sectional view illustrating an electric pot of the related art.

FIG. 1 is a drawing disclosed in U.S. Publication No. 2012-0091117 A1, the subject matter of which is incorporated herein by reference, and reference numerals in FIG. 1 are limitedly applied to FIG. 1.

Referring to FIG. 1, the electric pot of the related art includes a base 1 and a body 2 that are detachably coupled to each other. The body 2 accommodates contents (e.g., water or drinks and the like) therein, and a handle 29 is coupled to one side of the body 2. Accordingly, a user may tilt the body 2 using the handle 29 to pour the contents contained in the body 2 into a cup and the like.

The body 2 may receive electrical power from the base 1 through a coupling with the base 1, and may drive a heater provided in the body 2 using the received electric power. When the user provides an input in relation to an initiation (i.e., a start) of a temperature-maintenance operation to the electric pot, a temperature of the contents contained in the body 2 may be maintained at a certain temperature level for a certain period of time. When the user separates the body 2 from the base 1, the temperature-maintenance operation is stopped while electrical power being supplied to the body 2 is cut off.

According to the related art, when the temperature-maintenance operation is stopped due to the separation of the body 2 and the base 1, the temperature-maintenance operation is not resumed even though the user re-couples the body 2 and the base 1. That is, even when the user turns on the electric pot after re-coupling the body 2 and the base 1, the temperature-maintenance operation that was being performed before the separation is not resumed. The user is then required to re-set a temperature-maintenance operation. This is a cumbersome procedure for the user.

Suppose that the user uses the electric pot two or more times per day to make tea (e.g., leaves soaked in hot water). According to the related art, the user uses the electric pot once, and, when the user re-uses the electric pot after a while (i.e., when the user wants to re-use the electric pot to make tea by soaking leaves in hot water), the user is required to re-set a temperature-maintenance operation of the electric pot and to wait for a certain time. This is a cumbersome procedure for the user.

BRIEF DESCRIPTION OF THE DRAWINGS

Arrangements and embodiments will be described in detail with reference to the following drawings in which like reference numerals refer to like elements, and wherein.

DETAILED DESCRIPTION

Figure 1:
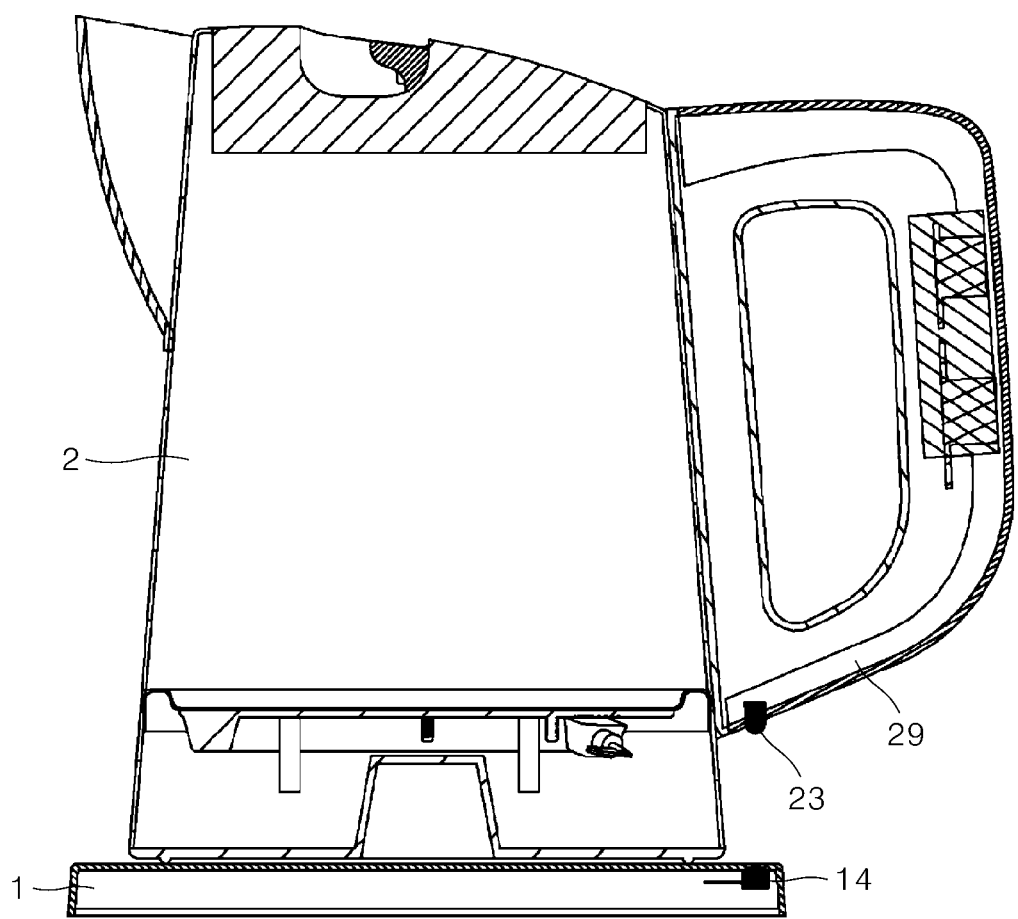
FIG. 1 is a cross-sectional view illustrating an electric pot of the related art.
Figure 2:
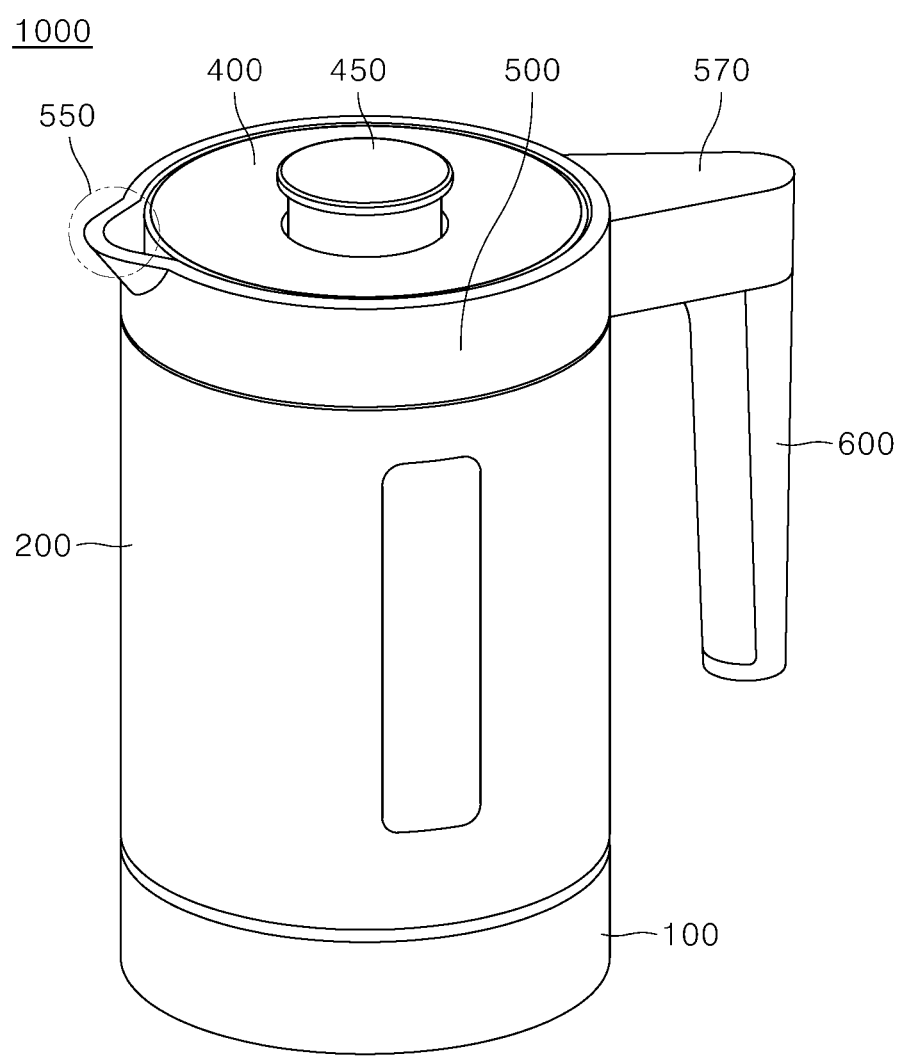
FIG. 2 is a perspective view illustrating an exemplary electric pot.
Figure 3:
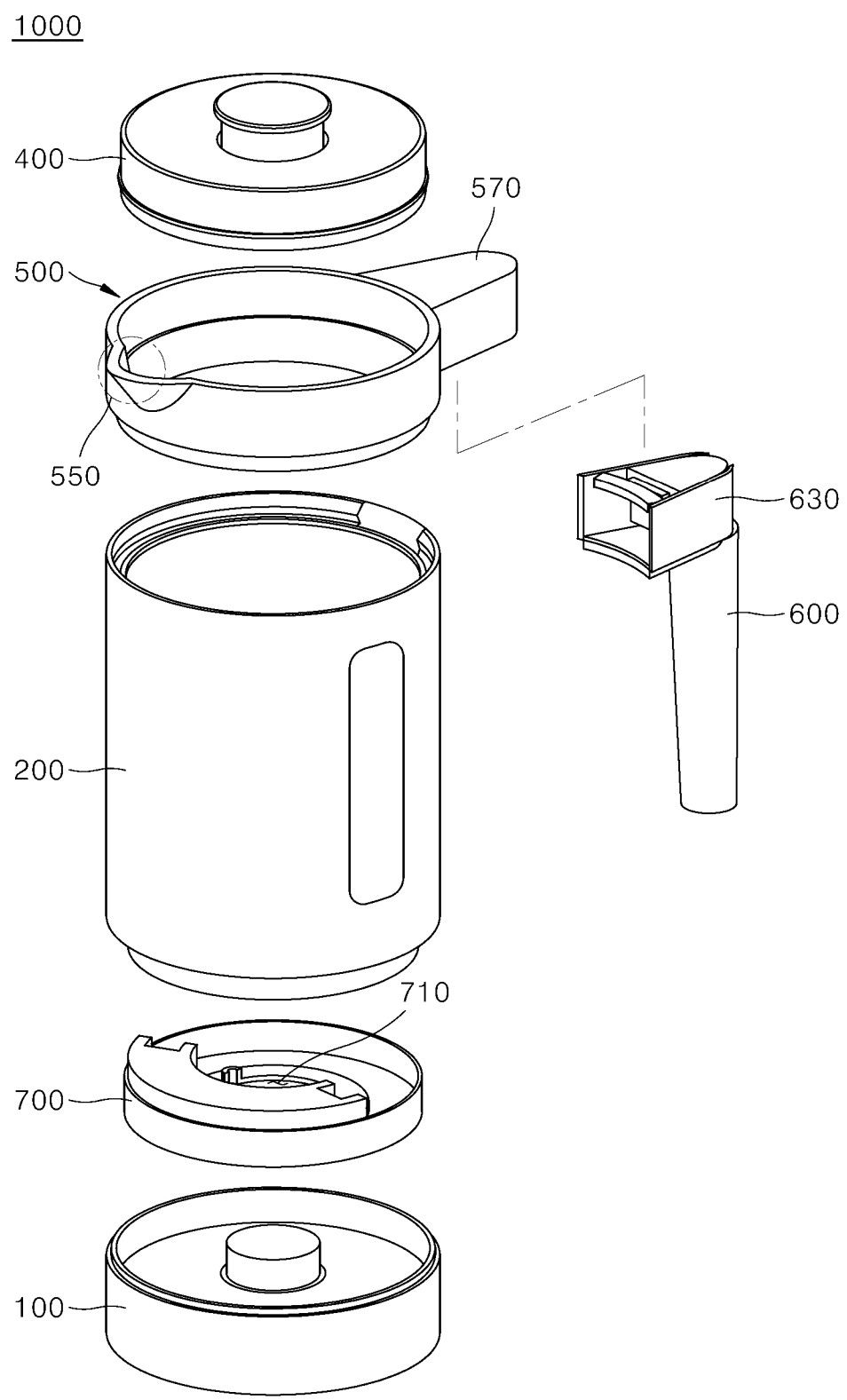
FIG. 3 is an exploded perspective view illustrating the electric pot in FIG. 2.
Figure 4:
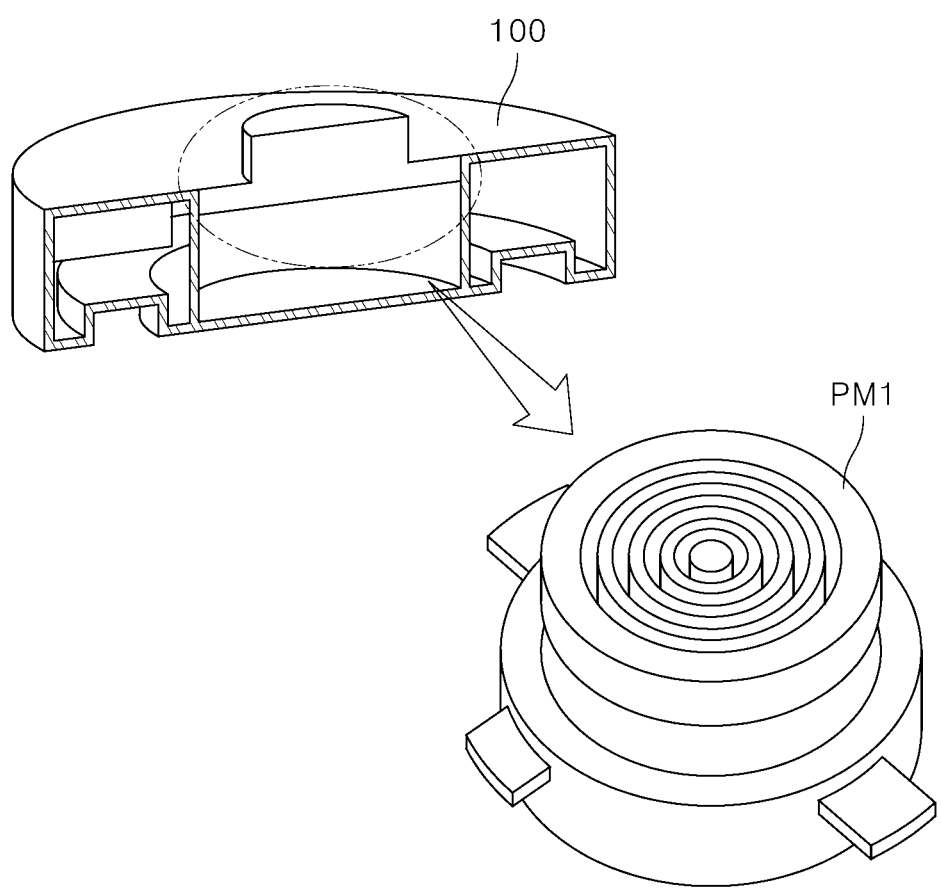
FIG. 4 is a cross-sectional view illustrating the supporter in FIG. 2.
Figure 5:
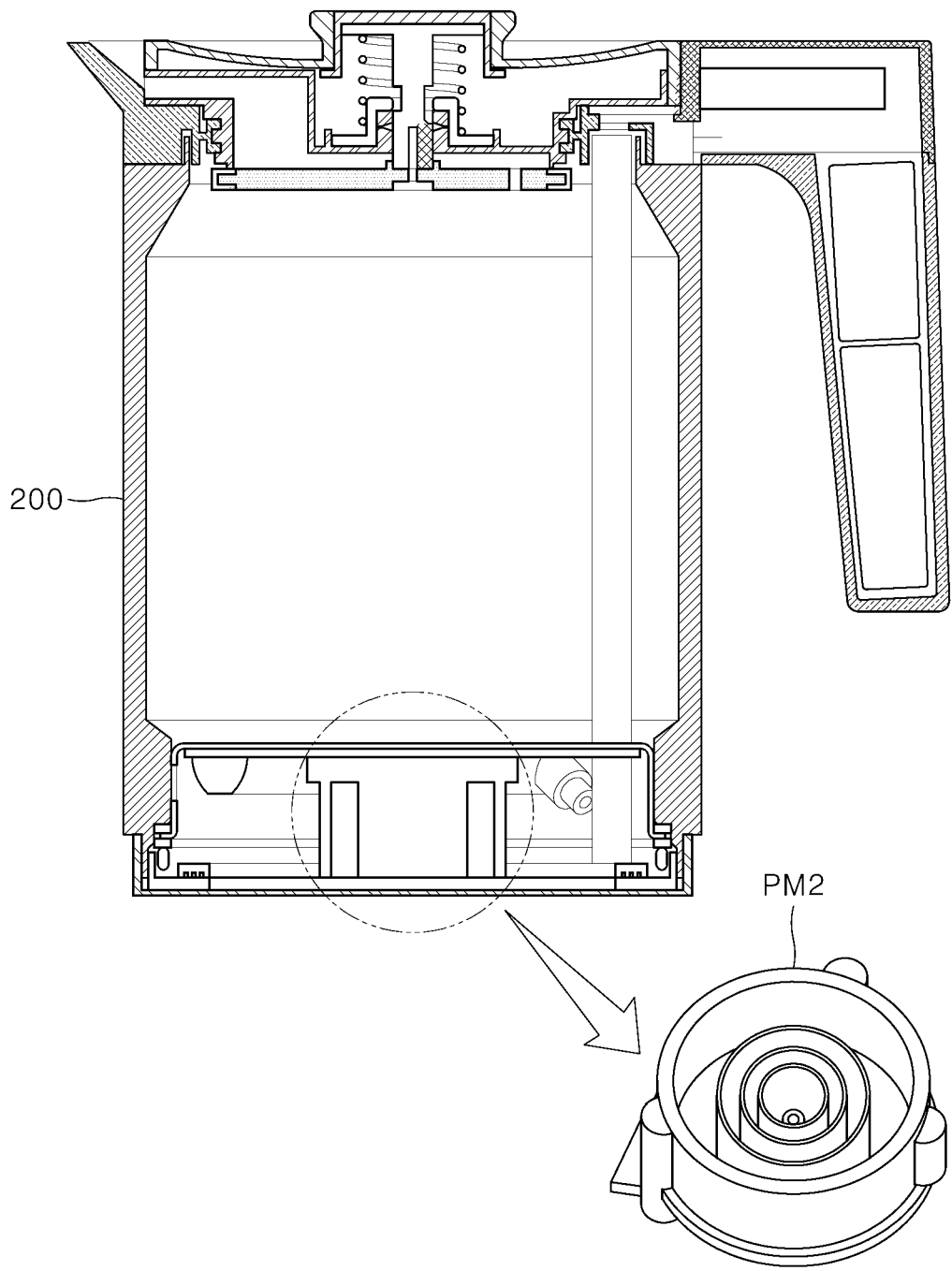
FIG. 5 is a cross-sectional view illustrating the pot main body in FIG. 2.
Figure 6:
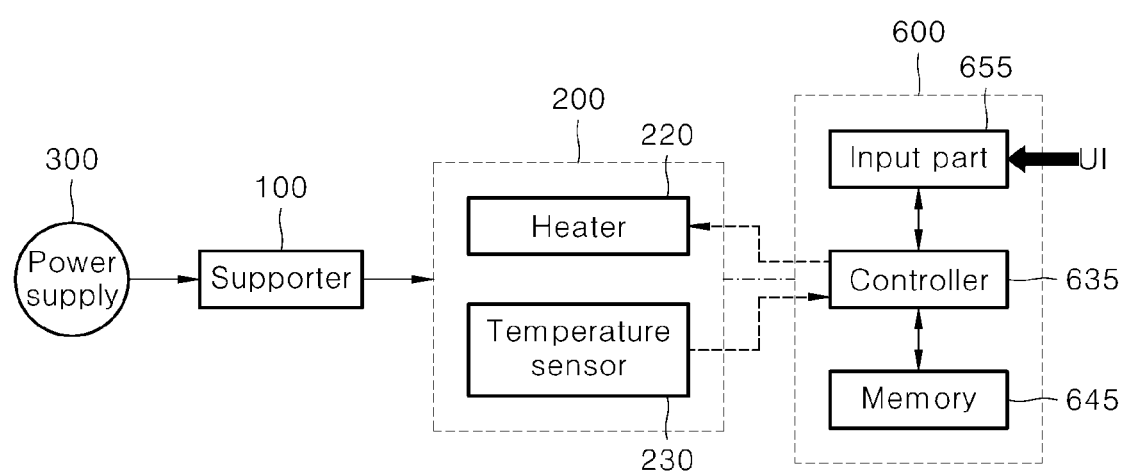
FIG. 6 is a schematic view illustrating a control flow of the electric pot in FIG. 2.

FIG. 2 is a perspective view illustrating an exemplary electric pot. FIG. 3 is an exploded perspective view illustrating the electric pot in FIG. 2. FIG. 4 is a cross-sectional view illustrating the supporter in FIG. 2. FIG. 5 is a cross-sectional view illustrating the pot main body in FIG. 2. FIG. 6 is a schematic view illustrating a control flow of the electric pot in FIG. 2.

The exemplary electric pot 1000 may include a supporter 100, a pot main body 200, a lid 400, a pot-main-body-upper-end coupler 500, a handle 600, a pot-main-body-lower-end coupler 700. The supporter 100 may be detachably coupled to a lower end of the pot main body 200.

The supporter 100 may be coupled to the lower end of the pot main body 200 and may support the pot main body 200. Additionally, the supporter 100 includes a power supply cable that is connected with an external power supply (i.e., a power supply 300 in FIG. 6), and, accordingly, may receive electrical power from the external power supply and may supply the electrical power to the pot main body 200.

As illustrated in FIG. 4, the supporter 100 is provided with a first power module (PM1) that protrudes upwards from an upper end of the supporter 100. The first power module (PM1) may have a cylindrical shape that protrudes upwards from a central portion of the upper end of the supporter 100. Additionally, the first power module (PM1) is electrically connected with a second power module (PM2) through a male-female coupling with the second power module (PM2) included in the pot main body 200, and, through the electric connection, the supporter 100 may deliver electrical power received from the external power supply to the pot main body 200. The first power module (PM1) may be male-female coupled to the second power module (PM2) and may also be electrically coupled to a heater 220 of the pot main body 200. That is, the supporter 100 and the pot main body 200 may be coupled through the male-female coupling between the first and second power modules (PM1, and PM2).

The pot main body 200 may be detachably coupled to the upper end of the supporter 100, and may contain contents (e.g., water, or drinks and the like) in the pot main body 200. The pot main body 200 has a space that may accommodate contents (e.g., water or drinks and the like), and is provided with a heater 220 that may heat the contents and is provided with a temperature sensor 230 that may measure (or sense) a temperature of the contents in real time, inside the pot main body 200. The pot main body 200 may operate by receiving electrical power from the supporter 100 through the coupling with the supporter 100.

Operations of the heater 220 may be controlled by a below-described controller 635, and the temperature sensor 230 may supply information on a measured (or sensed) temperature of contents to the controller 635.

The upper end of the pot main body 200 may be opened. Accordingly, the pot-main-body-upper-end coupler 500 may be coupled to the opened upper end of the pot main body 200. A user may put contents into the pot main body 200 through the opened upper end of the pot main body 200.

The pot main body 200 may include a thermal insulation material and a material that reduces heat transfer to allow contents to maintain their temperature levels. The pot main body 200 may have a cylindrical shape but is not limited to this example.

The pot main body 200, as illustrated in FIG. 5, may be provided with the second power module (PM2) male-female coupled to the first power module (PM1), at the lower end of the pot main body 200. The second power module (PM2) may be electrically connected with the first power module (PM1) through the male-female coupling with the first power module (PM1) included in the supporter 100, and, through the electric connection, the pot main body 200 may receive electric power from the supporter 100.

The lid 400 may be detachably coupled to an upper end of the pot-main-body-upper-end coupler 500. Specifically, the lid 400 may be coupled to the upper end of the pot-main-body-upper-end coupler 500 and may cover the opened upper end of the pot main body 200. Additionally, the lid 400 may be coupled to the pot-main-body-upper-end coupler 500 and may allow contents contained in the pot main body 200 to be discharged only through an outlet 550 of the pot-main-body-upper-end coupler 500. The lid 400 is provided with a knob 450, protruding upwards, on an upper surface of the lid 400. Accordingly, the user may attach the lid 400 to and detach the lid 400 from the pot-main-body-upper-end coupler 500 using the knob 450.

The pot-main-body-upper-end coupler 500 may be coupled between the upper end of the pot main body 200 and the lower end of the lid 400. The pot-main-body-upper-end coupler 500 may be coupled between the pot main body 200 and the lid 400, and upper and lower ends of the pot-main-body-upper-end coupler 500 may all be opened. Accordingly, the user may put contents into the pot main body 200 through the pot-main-body-upper-end coupler 500 the upper and lower ends of which are opened after lifting the lid 400. The pot-main-body-upper-end coupler 500 includes the outlet 550 at one side of the upper end of the pot-main-body-upper-end coupler 500. Accordingly, the contents contained in the pot main body 200 may be discharged outwards through the outlet 550 based on a degree to which the user tilts the pot main body 200, even in a state in which the lid 400 is coupled to the pot-main-body-upper-end coupler 500.

The outlet 550 may communicate with an inner space of the pot main body 200 to discharge the contents contained in the pot main body 200 outwards. Additionally, the pot-main-body-upper-end coupler 500 may be provided with a handle coupler 570 on one lateral surface of the pot-main-body-upper-end coupler 500. The handle 600 may be inserted into and coupled to the handle coupler 570.

The handle 600 may be inserted into and coupled to the handle coupler 570 and may be electrically connected to the pot main body 200. Accordingly, electrical power supplied from the supporter 100 to the pot main body 200 may also be delivered to the handle 600. The handle 600 may have a cylindrical shape that may be readily gripped in the hand of the user.

The handle 600 may be provided with an input part 655 (or input device), a controller 635, and a memory 645 inside an upper portion 630 (i.e., a portion inserted into and coupled to the handle coupler 570) of the handle 600. The input part 655 may receive an input relating to a temperature-maintenance operation and an input relating to driving of the heater 220 (e.g., an input relating to an initiation or a stop of driving of the heater 220) from the user, and may deliver the received input relating to a temperature-maintenance operation and the received input relating to driving of the heater 220 to the controller 635.

The input part 655 may also receive another input relating to driving of the electric pot from the user in addition to the input relating to a temperature-maintenance operation and input relating to driving of the heater 220. Detailed description in relation to this is omitted. The input part 655, for example, may include a touch substrate to which a metal touch sensor (e.g., a piezo disc) is attached. The input part 655 may be provided inside the upper portion 630 of the handle while being coupled to an inner side of one surface (e.g., an upper surface) of the handle coupler 570.

A touch area may be provided at an outer side of one surface of the handle coupler 570 to which the input part 655 is coupled. In the touch area, a plurality of touch points are provided. Accordingly, when the user presses a touch point, a specific operation corresponding to the touch point may be performed in the electric pot 1000.

The touch points may be displayed on the outer side of one surface of the handle coupler 570 through surface processing such as printing treatment or etching and the like such that the user recognizes positions of the touch points.

The input part 655 may be implemented at the handle 600 or the pot main body 200 and the like in the form of a button or in the form of a display to which a touch screen is applied, and not in the form of a touch substrate to which a metal touch sensor is attached.

The input part 655 including a touch substrate to which a metal touch sensor is attached is provided as an example for ease of description. When the user presses a touch point, information regarding a specific operation is displayed on a display, and the display, for example, may be provided at the handle coupler 570, the handle 600 or the pot main body 200 and the like.

The memory 645 may receive information regarding a temperature-maintenance operation from the controller 635 and may store the information. The memory 645 may retain the stored information regarding a temperature-maintenance operation regardless of whether the pot main body 200 is attached to and detached from the supporter 100.

The below-described controller 635 may read and write information (i.e., data) stored in the memory 645. The memory 645, for example, may include an electrically erasable programmable read-only memory (EEPROM) but is not limited to this example.

The controller 635 may control operations of various parts and components in the electric pot 1000 (i.e. entire operations of the electric pot 1000). The controller 635 may receive an input relating to a temperature-maintenance operation and an input relating to driving of the heater 220 from the input part 655, and may receive information regarding a temperature of contents from the temperature sensor 230. Additionally, the controller 635 may control the heater 220 based on the received input relating to a temperature-maintenance operation and the received information regarding a temperature of contents, to perform the temperature-maintenance operation. The controller 635 may also control the heater 220 based on the input relating to driving of the heater 220 and the information regarding a temperature of contents to perform a usual heating operation (i.e., an operation of heating contents).

The controller 635 may receive another input in relation to driving of the electric pot from the input part 655 in addition to the input in relation to a temperature-maintenance operation and the input in relation to driving of the heater 220. Detailed description in relation to this may be omitted.

As one example, the input relating to a temperature-maintenance operation may include an input regarding whether to initiate a temperature-maintenance operation (e.g., a start, a stop, an end and the like of a temperature-maintenance operation), an input regarding a target setting temperature and an input regarding an entire temperature-maintenance-continuation period, and the like.

When receiving the input in relation to a temperature-maintenance operation from the input part 655, the controller 635 may control the heater 220 to raise a temperature of the contents. When the temperature of contents reaches a target setting temperature, the controller 635 may control the heater 200 to allow the contents to maintain the target setting temperature (i.e., may initiate the temperature-maintenance operation).

When the temperature-maintenance operation is initiated, the controller 635 may update information on the temperature-maintenance operation and may provide the updated information to the memory 645 in every predetermined cycle until the entire temperature-maintenance-continuation period is over (or completed).

When the supporter 100 and the pot main body 200 are separated, the controller 635 may update the information regarding the temperature-maintenance operation based on status of the thermal insulation operation at the separation time. The controller 635 may provide the updated information to the memory 645, regardless of the predetermined cycle.

The information in relation to a temperature-maintenance operation, for example, may include information regarding whether to set a temperature-maintenance operation, information regarding a target setting temperature, information regarding a remaining temperature-maintenance-continuation period of the entire temperature-maintenance-continuation period, and the like.

Additionally, from the time when a temperature of contents reaches a target setting temperature, a temperature-maintenance operation and counting of an entire temperature-maintenance-continuation period may be initiated.

The initiation of a temperature-maintenance operation may denote an initiation of maintenance of the temperature of the contents, which reaches the target setting temperature, and the initiation of counting of the entire temperature-maintenance-continuation period may denote a gradual reduction in the entire temperature-maintenance-continuation period. For example, when the entire temperature-maintenance-continuation period is 30 minutes, the entire temperature-maintenance-continuation period may be gradually reduced from 30 minutes to 0 minute after counting is initiated.

When the pot main body 200 is separated from the supporter 100 in a state in which a temperature-maintenance operation is initiated, the controller 635 may stop the temperature-maintenance operation and counting of the entire temperature-maintenance-continuation period, and, at the time of separation, the controller 635 may update information in relation to a temperature-maintenance operation and may provide the updated information to the memory 645.

When the pot main body 200 separated from the supporter 100 is re-coupled to the supporter 110 and the controller 635 receives an input in relation to an initiation of driving of the heater 220 (i.e., when the user inputs the turning-on of the electric pot 1000) from the input part 655, the controller 635 may re-initiate driving of the heater 220, and may determine whether to re-initiate a temperature-maintenance operation based on the information in relation to a temperature-maintenance operation, which is updated and stored in the memory 645 at the time of separation.

More specifically, when the information in relation to a temperature-maintenance operation, which is updated and is stored in the memory 645 at the time of separation, indicates that a temperature-maintenance operation is set and there is a remaining temperature-maintenance-continuation period of the entire temperature-maintenance-continuation period, in a state in which amount of the contents is not insufficient, the controller 635 may control the heater 220 to re-initiate the temperature-maintenance operation.

When the temperature-maintenance operation is re-initiated, the counting of the remaining temperature-maintenance-continuation period of the entire temperature-maintenance-continuation period may be re-initiated after a temperature of contents reaches the target setting temperature.

When the information in relation to a temperature-maintenance operation, which is updated and is stored in the memory 645 at the time of separation, indicates that a temperature-maintenance operation is set and there is a remaining temperature-maintenance-continuation period of the entire temperature-maintenance-continuation period, in a state in which an amount of the contents is insufficient, the controller 635 may not re-initiate the temperature-maintenance operation.

When the information in relation to a temperature-maintenance operation, which is updated and is stored in the memory 645 at the time of separation, indicates that a temperature-maintenance operation is set, and that there is no remaining temperature-maintenance-continuation period of the entire temperature-maintenance-continuation period, the controller 635 may also not re-initiate the temperature-maintenance operation.

When the information in relation to a temperature-maintenance operation, which is updated and is stored in the memory 645 at the time of separation, indicates that a temperature-maintenance operation is not set, the controller 635 may not re-initiate the temperature-maintenance operation.

The information in relation to a temperature-maintenance operation, which is updated and is stored in the memory 645 at the time of separation, indicating that a temperature-maintenance operation is not set may denote that the temperature-maintenance operation is already finished prior to the time of separation, or that the temperature-maintenance operation is not initiated in the first place (i.e., that the user does not provide an input in relation to the temperature-maintenance operation from the beginning).

Regarding the amount of contents, when the driving of the heater 220 is re-initiated, the controller 635 may compare a time taken to allow a temperature of contents to reach a target setting temperature with predetermined reference time. Based on results of the comparison, The controller 635 may determine whether the amount of the contents is not insufficient, and, based on the determination, the controller 635 may determine whether to re-initiate the temperature-maintenance operation.

More specifically, when a time taken to allow a temperature of contents to reach a target setting temperature exceeds predetermined reference time, the controller 635 may determine that the amount of the contents is not insufficient. The controller 635 may control the heater 220 to re-initiate the temperature-maintenance operation based on results of the determination.

When a time taken to allow a temperature of contents to reach a target setting temperature is less than predetermined reference time, the controller 635 may determine that amount of the contents is insufficient and may not re-initiate the temperature-maintenance operation. When time taken to allow a temperature of contents to reach a target setting temperature is the same as predetermined reference time, the controller 635 may determine that amount of the contents is not insufficient, but not be limited.

That is, when time taken to allow a temperature of contents to reach a target setting temperature is the same as predetermined reference time, the controller 635 may also determine that the amount of the contents is not insufficient.

In an example embodiment, in which the controller 635 determines that amount of the contents is not insufficient when time taken to allow a temperature of the contents to reach a target setting temperature is the same as predetermined reference time, is described as an example for ease of description.

In the electric pot 1000 according to the example embodiment, the question of whether amount of the contents is not insufficient is an important factor in determining whether to re-initiate the temperature-maintenance operation. Accordingly, when the amount of the contents is insufficient, the temperature-maintenance operation may not be re-initiated, thereby preventing the pot main body 200 from being overheated and reducing the risk of fires and burns that may be caused by an overheated pot main body.

The pot-main-body-lower-end coupler 700 may be coupled between a lower end of the pot main body 200 and an upper end of the supporter 100. Specifically, the pot-main-body-lower-end coupler 700 may be coupled between the pot main body 200 and the supporter 100. Additionally, the pot-main-body-lower-end coupler 700 may include an insertion hole 710 at a central portion of the pot-main-body-lower-end coupler 700, and the first power module (PM1) of the supporter 100 may be inserted into and coupled to the insertion hole 710.

Figure 7:
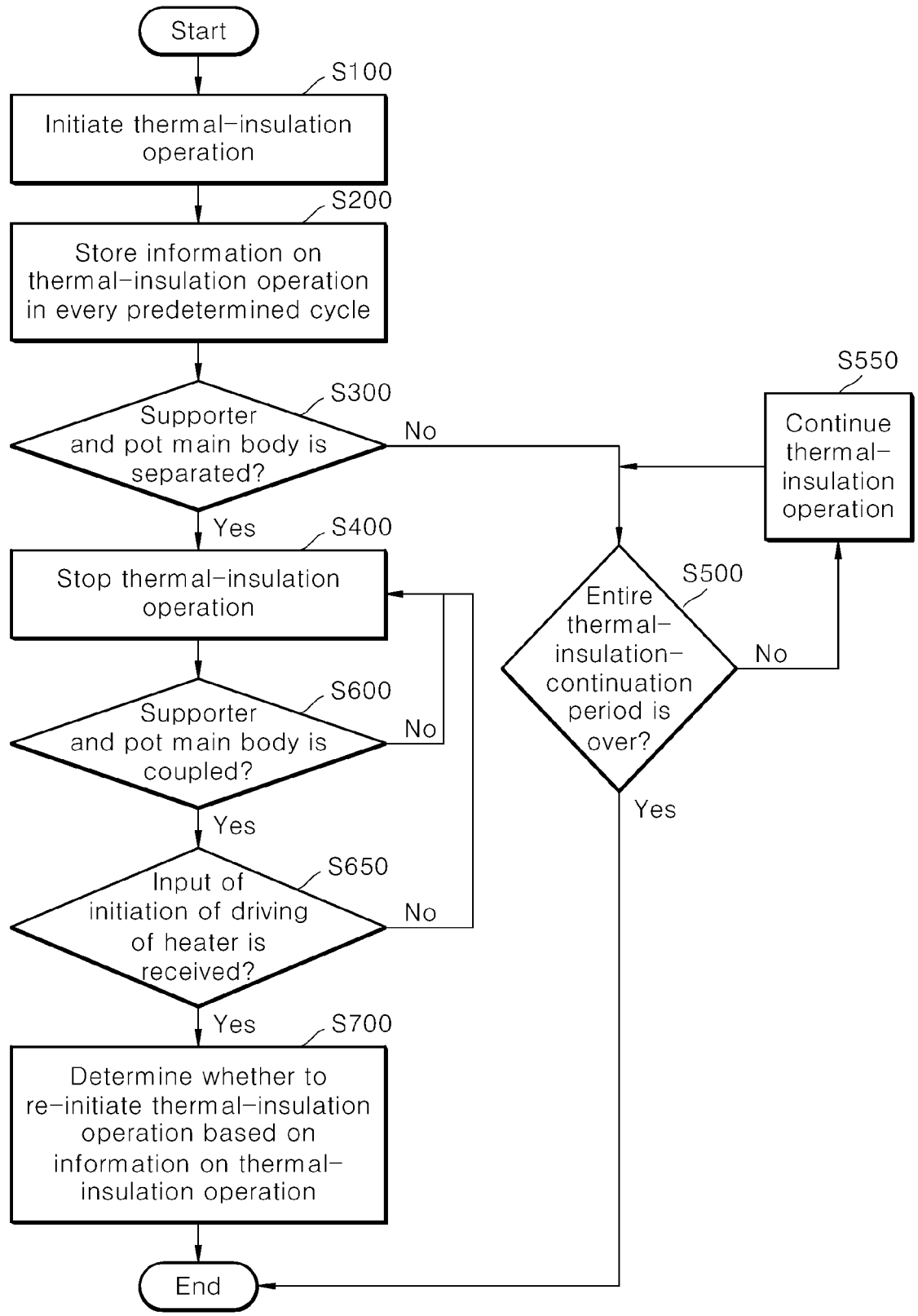
FIG. 7 is a flow chart illustrating a mechanism for continuing a temperature-maintenance operation of the electric pot in FIG. 2.
Figure 8:
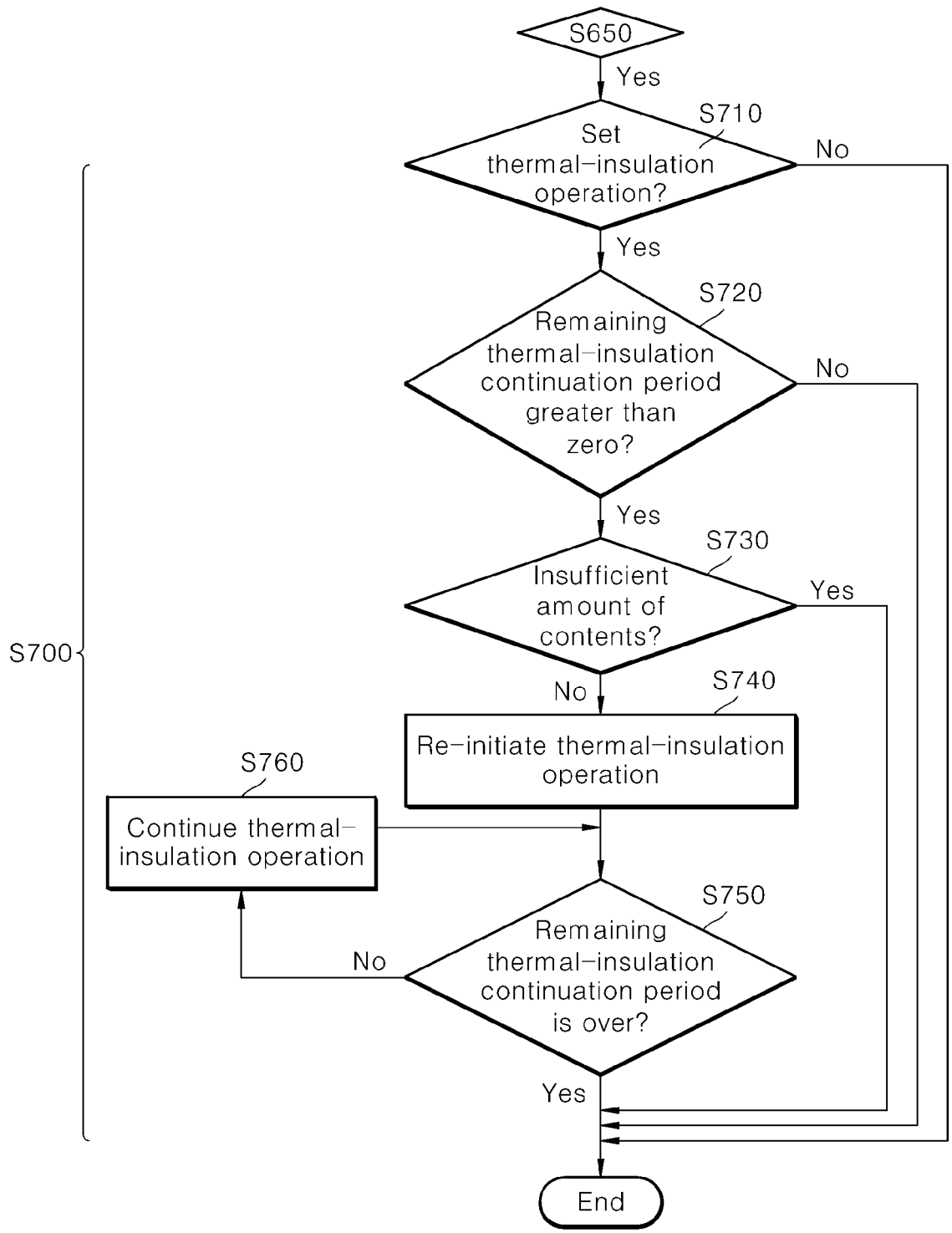
FIG. 8 is a flow chart illustrating step 700 in FIG. 7.

The electric pot 1000 according to the example embodiment has the above-described configurations and features. A mechanism for continuing a temperature-maintenance operation of the electric pot in FIG. 2 is described with reference to FIGS. 7 and 8. FIG. 7 is a flow chart illustrating a mechanism for continuing a temperature-maintenance operation of the electric pot in FIG. 2, and FIG. 8 is a flow chart illustrating step 700 in FIG. 7.

Referring to FIGS. 6 and 7, a temperature-maintenance operation is first initiated (S100). Specifically, a user may provide an input in relation to a temperature-maintenance operation to an input part 655 (or input device), and the input part 655 may provide the input in relation to a temperature-maintenance operation received from the user to the controller 635. Additionally, a temperature sensor 230 may measure (or sense) a temperature of contents accommodated in a pot main body 200 in real time, and may provide information on the measured temperature of contents to the controller 635. Accordingly, the controller 635 may control the heater 220 and may initiate a temperature-maintenance operation based on the received input in relation to a temperature-maintenance operation and the received information on the temperature of contents.

When the temperature-maintenance operation is initiated (S100), information in relation to a temperature-maintenance operation is stored in every predetermined cycle (S200). Specifically, when the temperature-maintenance operation is initiated, the controller 635 may update information in relation to a temperature-maintenance operation and may provide the updated information to the memory 645 in every predetermined cycle until an entire temperature-maintenance-continuation period is over (or completed) The memory 645 may receive the information in relation to a temperature-maintenance operation, updated in every predetermined cycle, from the controller 635, and may store the received information.

The user may separate the pot main body 200 from a supporter 100 to use contents (e.g., hot water) in the pot main body 200 while the temperature-maintenance operation is being performed (S300). Specifically, when the supporter 100 and the pot main body 200 are separated, the pot main body 200 may no longer receive electric power from the supporter 100. Accordingly, the heater 220 provided in the pot main body 200 and the controller 635 provided in a handle 600 may stop operating. Thus, the temperature-maintenance operation may stop (S400).

When the supporter 100 and the pot main body 200 are separated, the controller 635 may update information in relation to a temperature-maintenance operation. The controller 635 may provide the updated information to the memory 645 at the time of separation regardless of the predetermined cycle.

When the entire temperature-maintenance-continuation period is over (or complete) without separation of the supporter 100 and the pot main body 200 by the user while the temperature-maintenance operation is being performed (S500), the temperature-maintenance operation may also be completed (i.e., finished). When the entire temperature-maintenance-continuation period is not over, the temperature-maintenance operation may continue (S550).

After the temperature-maintenance operation is stopped (S400), the user may re-couple the supporter 100 and the pot main body 200 (S600). Specifically, when the supporter 100 and the pot main body 200 are coupled, the pot main body 200 may re-receive electric power from the supporter 100 and, accordingly, the electric power may also be re-supplied to the heater 220 provided in the pot main body 200 and the controller 635 provided in the handle 600.

When the user does not re-couple the supporter 100 and the pot main body 200, the temperature-maintenance operation remains stopped. The user may then turn on the electric pot 1000 after coupling the supporter 100 and the pot main body 200.

In order to turn on the electric pot 1000, the user may provide an input in relation to an initiation of driving of the heater 220 to the input part 655. Accordingly, the input part 655 may receive the input in relation to an initiation of driving of the heater 220 from the user and may provide the received input in relation to an initiation of driving of the heater 220 to the controller 635.

When receiving the input of an initiation of driving of the heater 220 (S650), the controller 635 may re-initiate driving of the heater 220 and may determine whether to re-initiate the temperature-maintenance operation based on the information in relation to a temperature-maintenance operation (S700).

When the user provides no input in relation to an initiation of driving of the heater 220 to the input part 655 although the supporter 100 and the pot main body 200 are coupled, the electric pot 1000 keeps turning off. Accordingly, the temperature-maintenance operation may remain stopped.

FIGS. 6 and 8 relate to a mechanism for determining whether to re-initiate the temperature-maintenance operation by the controller 635 The controller 635 may confirm whether a temperature-maintenance operation is set (S710).

More specifically, when information in relation to a temperature-maintenance operation, updated and stored in the memory 645 at the time of separation, indicates that a temperature-maintenance operation is not set even though the user re-couples the supporter 100 and the pot main body 200 after separating the pot main body 200 from the supporter 100, the controller 635 may not re-initiate the temperature-maintenance operation.

When the information in relation to a temperature-maintenance operation indicates that a temperature-maintenance operation is set, the controller 635 may confirm that the temperature-maintenance operation is set. When confirming that the temperature-maintenance operation is set, the controller 635 may confirm whether there is a remaining temperature-maintenance-continuation period of the entire temperature-maintenance-continuation period based on the information in relation to a temperature-maintenance operation, updated and stored in the memory 645 at the time of separation (S720).

More specifically, when the information in relation to a temperature-maintenance operation indicates that a temperature-maintenance operation is set, and that there is no remaining temperature-maintenance-continuation period of an entire temperature-maintenance-continuation period, the controller 635 may not re-initiate the temperature-maintenance operation. When the information in relation to a temperature-maintenance operation indicates that a temperature-maintenance operation is set, and there is a remaining temperature-maintenance-continuation period of the entire temperature-maintenance-continuation period, the controller 635 may confirm that there is the remaining temperature-maintenance-continuation period.

When confirming that there is the remaining temperature-maintenance-continuation period, the controller 635 may confirm whether contents are left in sufficient numbers and quantities (S730). Specifically, when the heater 220 is re-driven after the supporter 100 and the pot main body 200 are re-coupled, the controller 635 may compare a time taken to allow a temperature of contents to reach a target setting temperature with a predetermined reference time. The controller 635 may determine whether an amount of the contents is not insufficient based on results of the comparison, and may determine whether to re-initiate the temperature-maintenance operation based on results of the determination.

That is, when a time taken to allow a temperature of contents to reach a target setting temperature exceeds a predetermined reference time, the controller 635 may determine that the amount of the contents is not insufficient. The controller 635 may control the heater 220 to re-initiate the temperature-maintenance operation based on results of the determination.

When a time taken to allow a temperature of contents to reach a target setting temperature is less than predetermined reference time, the controller 635 may determine that amount of the contents is insufficient. The controller 635 may not re-initiate the temperature-maintenance operation based on results of the determination.

When the temperature-maintenance operation is re-initiated through the above-described mechanism regarding the determination on whether to re-initiate the temperature-maintenance operation (S740), the controller 635 may perform the temperature-maintenance operation during the remaining temperature-maintenance-continuation period.

When the remaining temperature-maintenance-continuation period is over (S750), the temperature-maintenance operation may also be completed (i.e., finished). When the remaining temperature-maintenance-continuation period is not over, the temperature-maintenance operation may be continued (S760).

The electric pot 1000 has an improved function of continuing a temperature-maintenance operation. Accordingly, the temperature-maintenance operation at the time of separation may be continued when the user re-couples the supporter and the pot main body after separating the pot main body from the supporter. Thus, a cumbersome procedure of re-setting a temperature-maintenance operation by the user is not required, thereby promoting user convenience and improving user satisfaction.

The electric pot 1000 may reduce the risk of fires and burns that may occur when a temperature-maintenance operation is performed, thereby enhancing credibility and safety of the electric pot.

The present disclosure is directed to providing an electric pot that may have an improved function of continuing a temperature-maintenance operation.

An electric pot according to the present disclosure may include a controller that controls a heater to perform a temperature-maintenance operation based on an input in relation to a temperature-maintenance operation and based on information on temperatures, and a memory that receives information in relation to a temperature-maintenance operation from the controller and stores the information and that retains the stored information in relation to a temperature-maintenance operation regardless of whether a pot main body is attached to or detached from a supporter, thereby having an improved function of continuing a temperature-maintenance operation.

The electric pot according to the present disclosure may include the controller that compares time taken to allow a temperature of contents to reach a target setting temperature with predetermined reference time, and based on results of the comparison, determines whether amount of the contents is not insufficient, and, based on results of the determination, determines whether to re-initiate a temperature-maintenance operation, thereby reducing the risk of fires and the risk of burns that may occur when the temperature-maintenance operation is performed.

The electric pot may have an improved function of continuing a temperature-maintenance operation. Accordingly, the electric pot may continue a temperature-maintenance operation at the time of separation when a user re-couples a supporter and a pot main body after separating the pot main body from the supporter while being capable of reducing the inconvenience of re-setting a temperature-maintenance operation by the user. This may promote user convenience and improving user satisfaction.

The electric pot may reduce the risk of fires and burns that may occur when a temperature-maintenance operation is performed, thereby enhancing credibility and safety of the electric pot.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric pot, comprising:
   a supporter that receives electrical power from a power supply;
   a pot main body that is detachably coupled to an upper end of the supporter, the pot main body to receive electrical power from the supporter based on a coupling with the supporter, and the pot main body includes:
      a heater to heat contents in the pot main body, and
      a temperature sensor to sense a temperature of the contents; and
   a handle to electrically connect to the pot main body, and the handle includes:
      an input device to receive a first input relating to a temperature-maintenance operation and a second input relating to driving of the heater,
      a controller configured to:
         receive, from the input device, the first input,
         receive, from the temperature sensor, information regarding a temperature of the contents,
         control the heater to perform the temperature-maintenance operation based on the received first input and the received information regarding the temperature of the contents, and
      a memory to receive, from the controller, information regarding the temperature-maintenance operation and to store the received information, and the memory to retain the stored information regarding the temperature-maintenance operation regardless of whether the pot main body is attached to the supporter or the pot main body is detached from the supporter,
   wherein the first input includes at least one of an input regarding whether to initiate the temperature-maintenance operation, an input regarding a target setting temperature, and an input regarding an entire temperature-maintenance-continuation periods, and
   the information regarding the temperature-maintenance operation includes at least one of information regarding whether the temperature-maintenance operation is set, information regarding the target setting temperature, and information regarding a remaining temperature-maintenance-continuation period of the entire temperature-maintenance-continuation periods, and
   wherein when the pot main body is separated from the supporter after the temperature-maintenance operation is initiated, the controller is to stop the temperature-maintenance-operation and counting of the entire temperature-maintenance-continuation periods, and is to update the information regarding the temperature-maintenance operation based on status of the temperature-maintenance operation at a separation time of the pot main body and the supporter, and the controller is to provide, to the memory, the updated information, and when the pot main body separated from the supporter is re-coupled to the supporter, and the controller receives, from the input device, the second input relating to an initiation of driving of the heater, the controller is to re-initiate driving of the heater, and is to determine whether to re-initiate the temperature-maintenance operation based on the updated information regarding the temperature-maintenance operation at the separation time.

2. The electric pot of claim 1, wherein the controller is configured to update the information regarding the temperature-maintenance operation in every predetermined cycle until the entire temperature-maintenance-continuation period is completed, and the controller is to provide the updated information to the memory, and wherein when the pot main body is separated from the supporter, the controller is to update the information regarding the temperature-maintenance operation based on status at the separation time of the pot main body and the supporter regardless of the predetermined cycle, and the controller is to provide the updated information to the memory.

3. The electric pot of claim 1, wherein when the controller receives, from the input device, the first input relating to the temperature-maintenance operation, the controller is to control the heater to raise the temperature of the contents, and when the temperature of the contents reaches the target setting temperature, the controller is to control the heater to maintain the temperature of the contents at the target setting temperature.

4. The electric pot of claim 3, wherein the temperature maintenance operation and counting of entire temperature-maintenance-continuation periods is initiated at a time when the temperature of the contents reaches the target setting temperature.

5. The electric pot of claim 1, wherein when the updated information regarding the temperature-maintenance operation at the separation time indicates that the temperature-maintenance operation is set and there is a remaining temperature-maintenance-continuation period of the entire temperature-maintenance-continuation periods, and when an amount of the contents is not insufficient, the controller is to control the heater to re-initiate the temperature-maintenance operation.

6. The electric pot of claim 1, wherein when the updated information regarding the temperature-maintenance operation at the separation time indicates that the temperature-maintenance operation is set and there is a remaining temperature-maintenance-continuation period of the entire temperature-maintenance-continuation periods, and when an amount of the contents is insufficient, the temperature-maintenance operation is not re-initiated by the controller.

7. The electric pot of claim 1, wherein when the updated information regarding the temperature-maintenance operation at the separation time indicates that the temperature-maintenance operation is set and there is no remaining temperature-maintenance-continuation period of the entire temperature-maintenance-continuation period, the temperature-maintenance operation is not re-initiate by the controller.

8. The electric pot of claim 1, wherein when the updated information relating to the temperature-maintenance operation at the separation time indicates that the temperature-maintenance operation is not set, the temperature-maintenance operation is not re-initiated by the controller.

9. The electric pot of claim 1, wherein when the temperature-maintenance operation is re-initiated, counting of a remaining temperature-maintenance-continuation period of the entire temperature-maintenance-continuation periods is re-initiated after the temperature of the contents reaches the target setting temperature.

10. The electric pot of claim 1, wherein when driving of the heater is re-initiated, the controller compares a time for a temperature of the contents to reach the target setting temperature with a predetermined reference time, and based on a result of the comparison, the controller is to determine whether an amount of the contents is not insufficient, and the controller is to determine whether to re-initiate the temperature-maintenance operation based on the determination.

11. The electric pot of claim 10, wherein when the time for the temperature of the contents to reach the target setting temperature exceeds the predetermined reference time, the controller is to determine that an amount of the contents is not insufficient, and the controller is to control the heater to re-initiate the temperature-maintenance operation based on a result of the determination, and wherein when the time for the temperature of the contents to reach the target setting temperature is less than the predetermined reference time, the controller is to determine that an amount of the contents is insufficient, and the temperature-maintenance operation is not re-initiated by the controller.

12. An electric pot, comprising:
a supporter that receives electrical power from a power supply;
a pot main body that is detachably coupled to an upper end of the supporter, the pot main body to receive electrical power from the supporter based on a coupling with the supporter, and the pot main body includes:
a heater to heat contents in the pot main body, and
a temperature sensor to sense a temperature in the pot main body; and
a handle that includes:
an input device to receive a first input relating to a temperature-maintenance operation and a second input relating to driving of the heater,
a controller configured to:
receive, from the input device, the first input,
receive, from the temperature sensor, information regarding a temperature of the contents,
control the heater to perform the temperature-maintenance operation based on the received first input and the received information regarding the temperature of the contents, and
provide information regarding the temperature-maintenance operation at a time that the pot main body is separated from the supporter;
a memory to receive, from the controller, the information regarding the temperature-maintenance operation at the time that the pot main body is separated from the supporter, and the memory to retain the information while the pot main body is separated from the supporter and when the pot main body is re-coupled to the supporter,
wherein when the pot main body is separated from the supporter after the temperature-maintenance operation is initiated, the controller is to stop the temperature-maintenance-operation and counting of the entire temperature-maintenance-continuation periods, and is to update the information regarding the temperature-maintenance operation at the time that the pot main body is separated from the supporter, and the controller is to provide, to the memory, the updated information, and when the pot main body separated from the supporter is re-coupled to the supporter, and the controller receives, from the input device, the second input relating to an initiation of driving of the heater, the controller is to re-initiate driving of the heater, and is to determine whether to re-initiate the temperature-maintenance operation based on the updated information regarding the temperature-maintenance operation.

13. The electric pot of claim 12, wherein the first input relating to the temperature-maintenance operation includes at least one of an input regarding whether to initiate the temperature-maintenance operation, an input regarding a target setting temperature, and an input regarding an entire temperature-maintenance-continuation periods, and the information regarding the temperature-maintenance operation includes at least one of information regarding whether the temperature-maintenance operation is set, information regarding the target setting temperature, and information regarding a remaining temperature-maintenance-continuation period of the entire temperature-maintenance-continuation periods.

14. The electric pot of claim 12, wherein the controller is configured to update the information regarding the temperature-maintenance operation in every predetermined cycle until an entire temperature-maintenance-continuation period is completed, and the controller is to provide the updated information to the memory, and wherein when the pot main body is separated from the supporter, the controller is to update the information regarding the temperature-maintenance operation at the time that the pot main body is separated from the supporter regardless of the predetermined cycle, and the controller is to provide the updated information to the memory.

15. The electric pot of claim 12, wherein when the controller receives, from the input device, the first input relating to the temperature-maintenance operation, the controller is to control the heater to raise the temperature of the contents, and when the temperature of the contents reaches the target setting temperature, the controller is to control the heater to maintain the temperature of the contents at the target setting temperature.

16. The electric pot of claim 15, wherein the temperature maintenance operation and counting of entire temperature-maintenance-continuation periods is initiated at a time when the temperature of the contents reaches the target setting temperature.

17. The electric pot of claim 12, wherein when the updated information regarding the temperature-maintenance operation at the time that the pot main body is separated from the supporter indicates that the temperature-maintenance operation is set and there is a remaining temperature-maintenance-continuation period of the entire temperature-maintenance-continuation periods, and when an amount of the contents is not insufficient, the controller is to control the heater to re-initiate the temperature-maintenance operation.

* * * * *